A. K. EATON, OF PIERMONT, ASSIGNOR TO HIMSELF, ALBON MAN, OF BROOKLYN, NEW YORK, AND JAMES MACDONOUGH, OF NEW YORK CITY.

Letters Patent No. 87,153, dated February 23, 1869.

IMPROVEMENT IN THE MANUFACTURE OF STEEL.

The Schedule referred to in these Letters Patent and making part of the same.

*To all whom it may concern:*

Be it known that I, A. K. EATON, of Piermont, in the county of Rockland, and State of New York, have invented certain new and useful Improvements in the "Art of Manufacturing Steel;" and I do hereby declare the following to be such a full, clear, and exact description of the same, as will enable any one skilled in the art to which my invention appertains, to work and practise the same.

The art of manufacturing steel, as now practised by those engaged in the trade, is so well understood, that any description of it here is unnecessary. It is only, therefore, left for me to describe in what my improvements in that art consist.

The object of my invention is of course to produce a superior quality of steel, as cheaply or cheaper than it is now produced—a steel possessing great uniformity of texture, softness, toughness, and a capacity to receive a uniform temper, which may be varied from a low to a very high degree of hardness. This object I accomplish, by uniting with the iron, in the process of its manufacture into steel, a small percentage of aluminium, in addition to the elements or ingredients now employed in the manufacture of steel.

In the practice of my invention, I first produce an aluminate of iron, by the combination of alumina and protoxide or peroxide of iron, mixing them in their equivalent proportions, and exposing them to an intense heat, in any suitably-constructed furnace or crucible, until they fuse together. I then fuse this aluminate of iron in contact with highly-carburetted cast-iron, adding, if necessary, sufficient wrought-iron to reduce the proportion of carbon to the proper degree for the production of cast-steel, the manipulation of the material in the furnace being in other respects the same as in the manufacture of steel after the old process.

In this process of mine, the carbon of the cast-iron, by its reaction upon the alumina, and the oxide of iron of the aluminate, reduces them both to the metallic state, yielding an alloy of aluminium and iron, which combines with the decarbonized cast-iron to form steel. If the amount of carbon is not sufficiently reduced by this process, then the wrought-iron is added, but not otherwise.

The method above described is more especially applicable to the manufacture of steel in crucibles, and is substantially the same as that employed in the reverberating furnace; but in the manufacture of puddle-steel, I modify this practice somewhat in this wise. I first cover the bottom of the furnace with a layer of alumina, the upper stratum or part of which is mixed with oxide of iron, enough to fuse with and hold the alumina. I then heat the furnace to the required temperature to partially fuse and consolidate the bottom prepared as above. I then charge the furnace with cast-iron, and manipulate it in the usual method.

By this practice, the aluminate of iron is first formed as in the above-described process, and is afterward reduced by its contact with the melted cast-iron.

In preparing the bottom of the furnace, it is not absolutely necessary to mix the oxide of iron with the alumina, for the alumina alone will be reduced by the action of the melted cast-iron. But in preparing the bottom of the furnace with alumina, it is important that some substance should be used with it, to cause the adhesion of its atoms, and consolidate it in a refractory mass, and which will not interfere with the chemical reactions of the furnace.

The silicate of alumina, for example, in its more refractory form, may be used as a substitute for the oxide of iron.

The same result may be obtained by making the bottom of the furnace of brick composed of alumina, united with some refractory substance, which will yield a brick capable of resisting the heat of the furnace, and at the same time leave the chemical effect of the alumina upon the iron unimpaired.

The above-described practice of manufacturing steel with aluminium as an element therein, is, I think, the most desirable method of producing it. But this kind of steel may be manufactured by first making an alloy of alumina, iron, and carbon, and by then melting this alloy with wrought-iron in a furnace or crucible, substantially such as above described.

The alloy of aluminium and iron, to be used for this purpose, I obtain by first making an aluminate of iron, or protoxide or peroxide of iron and alumina, which I mix according to their chemical equivalents, and afterwards subject them to a high heat in a crucible or reverberatory furnace.

The aluminate thus formed, I then reduce in a crucible or furnace, in the presence of and in contact with carbon (charcoal) and wrought-iron, obtaining, as the result, an alloy of aluminium, carbon, and iron, which I now melt with wrought-iron, and obtain a very superior quality of steel as the result.

In either of the above processes, manganese, which is an essential element of good steel, may be added, in the form of an aluminate of this oxide of manganese, which may be produced and reduced in the same way precisely as in the case of the aluminate of iron.

Having now described the nature and extent of my invention,

What I claim as new herein, and desire to secure by Letters Patent, is—

1. Manufacturing steel, by uniting with the iron from which it is produced, an alloy of aluminium and iron, substantially as described.

2. The manufacture of steel, by forming an alumiate of iron in a crucible or furnace, and by reducing aid aluminate with cast-iron, simultaneously in said furnace or crucible, (adding wrought-iron if necessary,) thus causing oxide of iron, aluminia, and cast-iron, to so react upon each other as to produce, successively, aluminate of iron, aluminium, and the new alloyed steel, at the different stages of the same process.

3. The manufacture of steel, by causing the reaction of cast-iron upon alumina alone, or alumina combined with substances that do not interfere with such reaction, (as in the case of the base of alumina as a material for brick,) thus effecting, simultaneously, the reduction of alumina, and the decarbonization of cast-iron, in whole or in part, so as to produce steel or an alloy to be melted with wrought-iron to produce steel.

A. K. EATON.

Witnesses:
AMOS BROADNAX,
DAVID E. CRONIN.